United States Patent [19]

Romberg et al.

[11] Patent Number: 5,252,879
[45] Date of Patent: Oct. 12, 1993

[54] MULTI-PART ROTOR SHAFT FOR SMALL ELECTRIC MOTORS

[75] Inventors: Lothar Romberg; Jürgen Henke, both of Oldenburg, Fed. Rep. of Germany

[73] Assignee: Licentia Patent-Verwaltungs-GmbH, Frankfurt am Main, Fed. Rep. of Germany

[21] Appl. No.: 841,531

[22] Filed: Feb. 26, 1992

[30] Foreign Application Priority Data

Feb. 27, 1991 [DE] Fed. Rep. of Germany ....... 4106131

[51] Int. Cl.$^5$ .............................................. H02K 1/22
[52] U.S. Cl. ........................................ 310/261; 310/42;
310/91; 403/261; 403/268; 403/360; 464/182
[58] Field of Search .............. 310/261, 262, 264, 265,
310/267, 42, 211, 195, 91, 81, 66, 48, 263, 268,
40 MM; 464/182, 185, 179; 403/268, 272, 256,
261, 360; 29/598; 74/572

[56] References Cited

U.S. PATENT DOCUMENTS

| | | | |
|---|---|---|---|
| 2,149,194 | 2/1939 | Stopp | 464/182 |
| 3,780,428 | 12/1973 | Zorev | 310/42 |
| 3,969,032 | 7/1976 | Wolicki | 403/271 |
| 4,172,678 | 10/1979 | Schonwald | 403/268 |
| 4,365,179 | 12/1982 | Magdaleno | 310/81 |
| 4,455,498 | 6/1984 | DeSisto | 310/42 |
| 4,541,160 | 9/1985 | Roberts | 464/182 |
| 4,970,424 | 11/1990 | Nakamura | 310/262 |
| 5,089,736 | 2/1992 | Oyafuso | 310/42 |

FOREIGN PATENT DOCUMENTS

| | | | |
|---|---|---|---|
| 1049968 | 2/1959 | Fed. Rep. of Germany . | |
| 2244032 | 3/1974 | Fed. Rep. of Germany . | |
| 0027587 | 2/1903 | Switzerland . | |
| 0508604 | 3/1976 | U.S.S.R. | 464/179 |

*Primary Examiner*—R. Skudy
*Attorney, Agent, or Firm*—Spencer, Frank & Schneider

[57] ABSTRACT

A rotor for an electric motor includes a rotor lamina stack defining a throughgoing opening and having opposite end faces; and a rotor shaft which is composed of three parts: a central shaft portion received in the central opening and having first and second ends projecting from the rotor lamina stack beyond the respective opposite end faces; a first separate shaft stub received on the first end of the central shaft portion; and a second separate shaft stub received on the second end of the central shaft portion.

5 Claims, 1 Drawing Sheet

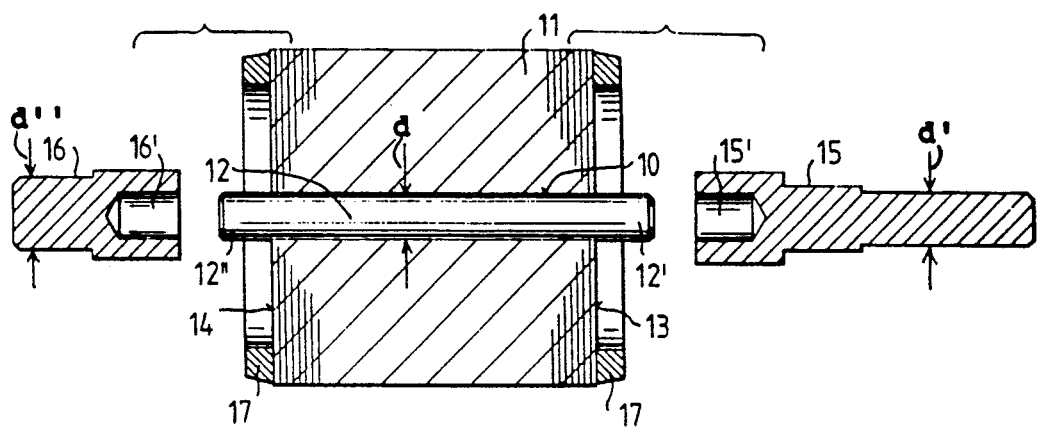
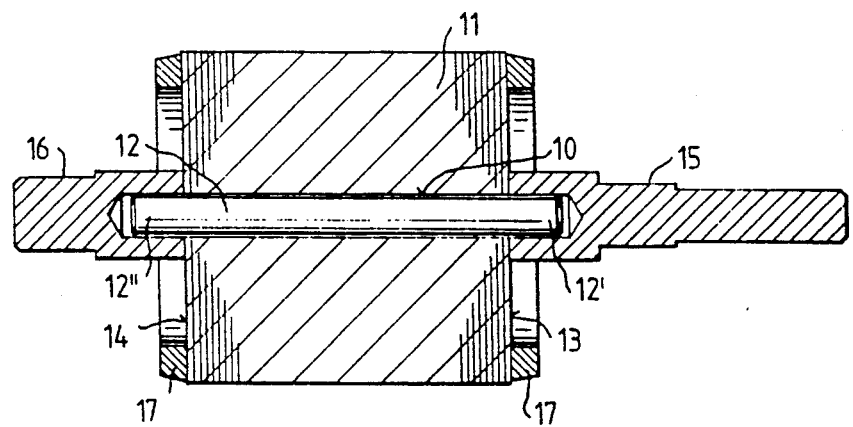

MULTI-PART ROTOR SHAFT FOR SMALL ELECTRIC MOTORS

BACKGROUND OF THE INVENTION

This invention relates to a rotor shaft for small electric motors.

The rotor shaft of relatively small electric motors often has to be designed according to particular customer specifications; only on rare occasions does a specifically designed small electric motor satisfy the exact requirements of a different customer. Thus, at least when designing the output (driving) end of the rotor shaft, the specific structural conditions of the environment have to be taken into account, while at the opposite end, the rotor shafts of the motors may generally be of identical construction. For the motor manufacturer this means that even in case of large unit numbers of a rotor design a large number of customer-specified shafts are involved which have to be manufactured in small lots, requiring a great number of master shafts or CNC-programs which render the manufacturing process expensive.

SUMMARY OF THE INVENTION

It is an object of the invention to provide an improved rotor shaft for small electric motors wherein the rotor may be manufactured in large lots independently from the customer-specified rotor shaft and the rotor shaft may be structurally complemented in accordance with customer specifications.

This object and others to become apparent as the specification progresses, are accomplished by the invention, according to which, briefly stated, the rotor shaft is a three-part component including a central shaft portion which is inserted into the rotor lamina stack and which has opposite free ends projecting beyond both end faces of the rotor structure. The rotor shaft further has a separately made driving shaft stub received by one end of the central shaft portion and a separately made non-driving shaft stub received by the other, opposite end of the central shaft portion.

It is a further advantage of the invention that often a high-grade steel is needed solely for the output (driving) shaft stub while the rotor shaft portion which extends inside the lamina stack as well as the shaft stub opposite to the driving stub may be made of a lower grade steel. It is still another advantage of the invention that the three-part structure of the shaft makes possible a reduction of the diameter of the central shaft portion situated within the lamina stack which results in a significant saving of shaft material.

BRIEF DESCRIPTION OF THE DRAWING

FIG. 1 is a sectional axial exploded view of a preferred embodiment of the invention.

FIG. 2 is a view similar to FIG. 1, showing the components in an assembled state.

DESCRIPTION OF THE PREFERRED EMBODIMENT

Turning to FIG. 1, in a central bore 10 of a rotor lamina stack 11 a one-piece central shaft portion 12 is press-fitted which, after the die-casting process remains in the lamina stack 11. The diameter of the central shaft portion 12 may be about 50% less than the rotor shaft in conventional rotors. The making of pins which later have to be pressed out of the structure may be dispensed with. The shaft ends 12' and 12" of the central shaft portion 12 project to a certain extent beyond the respective end faces 13 and 14 of the rotor. The material for the central shaft portion 12 may be an inexpensive, unalloyed free-cutting steel (machining steel). On opposite end faces of the rotor lamina stack 11 short-circuiting rings 17 are provided. Rotors having the above-outlined construction may be manufactured in large numbers prior to their assignment to customers who have specific requirements. The rotor structures thus may be held in readiness as modules.

The shaft stub 15 intended for the driving side is made of the required material and is shaped according to customer specifications. The shaft stub 15 is provided with a blind bore 15' which is adapted to the diameter of the shaft end 12' so that the customer-specific shaft stub 15 may be inserted on the shaft end 12' and may be affixed (bonded) thereto by welding or gluing (not shown). FIG. 2 shows the center shaft portion 12 and the shaft stub 15 in an assembled state.

Similar considerations, apply to the shaft stub 16 to be associated with the shaft end 12" of the central shaft portion 12. The shaft stub 16 too, has a blind bore 16' which is adapted to the diameter of the shaft end 12" to be united therewith by means of insertion and subsequent welding or gluing. The outer diameter d of the central shaft portion 12 is less than the outer diameter d' of the shaft stub 15 and the outer diameter d" of the shaft stub 16.

The affixation of the shaft stubs 15 and 16 to the shaft ends 12' and 12" may be effected by automatic assembly. Since shaft stubs 16 are generally not customer-specific and the shaft end 12" may generally be identical for all motors, the shaft stubs 16 may also be manufactured in large numbers and the material may be identical to that of the central shaft portion 12.

If, for example, a customer wishes to obtain, for the same use, motors with different outputs while maintaining the outer diameter of the stator lamina stack the same, the length of the rotor lamina stack needs to be altered. Since the shaft stubs 15 and 16 remain the same, it is only the central shaft portion 12 which should be shorter or longer.

It will be understood that the above description of the present invention is susceptible to various modifications, changes and adaptations, and the same are intended to be comprehended within the meaning and range of equivalents of the appended claims.

What is claimed is:

1. An electric-motor rotor comprising
   (a) a rotor lamina stack defining a throughgoing opening and having opposite end faces; and
   (b) a rotor shaft including
      (1) a central shaft portion received in said opening and having first and second shaft ends projecting from said rotor lamina stack beyond the opposite end faces;
      (2) first and second separate shaft stubs each having a blind bore; the blind bore of said first separate shaft stub receiving said first shaft end and the blind bore of said second separate shaft stub receiving said second shaft end; and
      (3) means for bonding said first and second shaft ends in the blind bores to said first and second separate shaft stubs.

2. An electric-motor rotor as defined in claim 1, wherein said central shaft portion, and said first and second separate shaft stubs have respective outer diameters; the outer diameter of said central shaft portion is smaller than the outer diameter of said first and second separate shaft stubs.

3. An electric-motor rotor as defined in claim 1, wherein said central shaft portion and said second separate shaft stub is of machine steel and said first separate shaft stub is of high-grade steel.

4. An electric-motor rotor as defined in claim 1, wherein said means for bonding comprises a weld.

5. An electric-motor rotor as defined in claim 1, wherein said means for bonding comprises a glue.

* * * * *